March 13, 1951
E. J. WARREN
2,544,814
ASSEMBLY FOR TILTABLY MOUNTING
A CIRCULAR SAW ON AN ARBOR
Filed Dec. 4, 1947
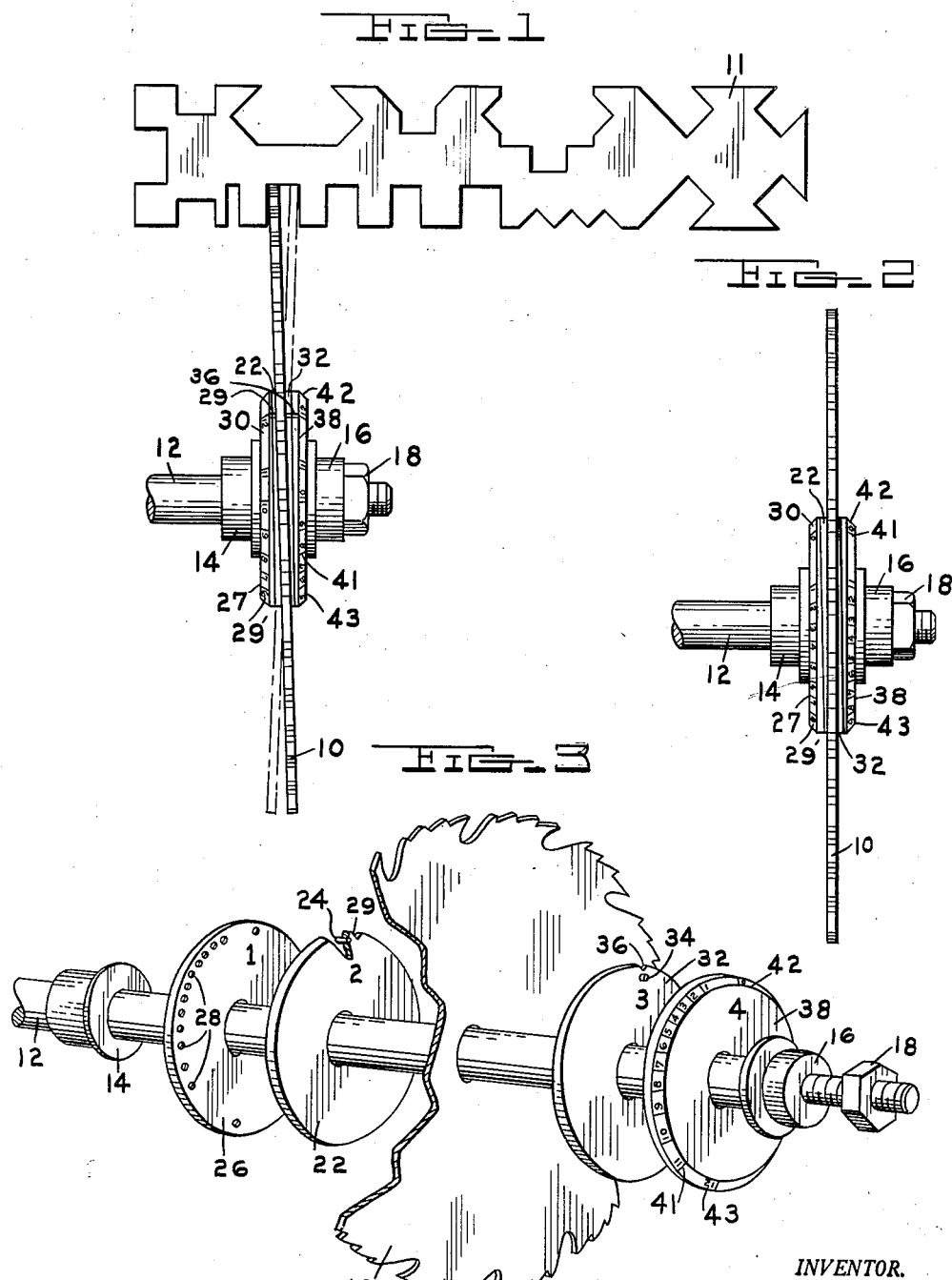
INVENTOR.
EMMET J. WARREN
BY
Burton & Parker
ATTORNEYS Patented Mar. 13, 1951

2,544,814

UNITED STATES PATENT OFFICE 2,544,814

ASSEMBLY FOR TILTABLY MOUNTING A CIRCULAR SAW ON AN ARBOR

Emmet J. Warren, Detroit, Mich.

Application December 4, 1947, Serial No. 789,623

1 Claim. (Cl. 144—238)

This invention relates to an improved dado saw assembly.

An object is to provide improved supporting and retaining discs or washers for a circular saw mounted upon an arbor which discs are readily relatively adjustable to position the saw blade either perpendicularly or at an inclination with respect to the axis of the arbor whereby the saw may be used either as a cut-off saw or as a dado saw.

The improved adjustable supporting discs of my saw assembly are so designed as to be capable of being quickly adjusted without complete disassembly of the structure and merely by backing off one of the discs with respect to the cooperating disc. The discs are adapted to be quickly and accurately adjusted to position the saw at such an inclination with respect to the axis of the arbor as to cut a groove of the desired width, within limits, and the discs are so constructed that the desired adjustment thereof may be readily determined by the operator. The construction of the retaining discs is such that they will securely maintain the adjustment to which they have been placed and they will securely hold the saw at each adjusted position and the adjustment of the discs is indicated at all times to the operator.

Other objects, advantages and meritorious features of this invention will more fully appear from the following description, claim and accompanying drawing wherein:

Fig. 1 is a side elevation of a saw assembly wherein the saw is positioned to cut a groove of a substantially greater width than the thickness of the saw blade.

Fig. 2 is a side elevation of the saw assembly shown in Fig. 1 showing the saw blade positioned perpendicularly with respect to the axis of the arbor.

Fig. 3 is a perspective of a saw assembly showing the several parts partially disassembled to illustrate the exact construction and cooperation thereof.

My improved mounting for a dado saw is shown in connection with a saw 10 mounted upon an arbor 12 and held in place through use of my improved mounting discs, hereinafter described, which are clamped between suitable nuts or plates mounted upon the arbor. The saw is an ordinary circular saw. The clamping nuts shown include a plate 14 fixed upon the arbor and a plate or washer 16 slidable upon the arbor and held by a nut 18 threaded upon the threaded end of the arbor.

Between the plate 14 and washer 16 are mounted my improved retaining discs which grip and hold the saw at its desired position with respect to the axis of the arbor. Two pairs of these retaining discs or washers are shown. One pair is disposed upon one side of the saw and the other pair is disposed upon the other side of the saw.

These two pairs of discs are complementary. Each pair consists of an inner disc and an outer disc. For convenience of assembly the discs may be numbered 1 through 4 as shown in Fig. 3. The two discs of each pair are so shaped as to taper from a maximum thickness at one end of a diameter of the disc to a minimum thickness at the opposite end of such diameter of the disc. The inner disc of the inner pair identified as 22 is provided with a locking pin 24 which projects toward the outer disc 26 of such pair. This pin is adapted to be received in any one of a plurality of pin receiving recesses 28 in the outer disc. The inner disc is provided with a peripheral notch 29 which registers with the position of the locating pin 24.

The outer disc of such pair is provided with such plurality of recesses 28 arranged spaced apart in a circumferential sequence adjacent to the periphery of the disc which sequence extends circumferentially of the disc from a point at one end of such diameter of the disc to a point adjacent to the opposite end of the diameter. The outer disc 26 of such pair is provided with a beveled marginal face 30 which bears a series of indicating marks 27 and numbers 29' that register with the pin receiving recesses 28. These indicating marks are shown as extending from zero (0) to twelve (12) though it is apparent that any continuation thereof might be employed and the marks are arranged at spaced distances about one-half of the periphery of the disc.

The discs of the outer pair are similar to the discs of the inner pair just described and comprise an inner disc 32 provided with a pin 34 and a peripheral notch 36 and an outer disc 38 provided with a sequence of pin receiving recesses not shown but arranged as hereinabove described in connection with the outer disc of the inner part and complementary therewith. This outer disc 38 also has an outer beveled marginal face 42 provided with a series of indicating marks 41 and numbers 43 registering with the pin receiving recesses. It will be noted that the indicating numbers on the outer disc of one pair (the inner pair) start with zero (0) at the minimum disc thickness end of the diameter and extend toward the maximum disc thickness end thereof while the arrangement of the numbers on the outer disc of the other pair (the outer pair) is just the reverse, namely, the zero (0) is at the end of the diameter which corresponds with the maximum thickness of the disc.

To position the saw at any desired angle of inclination with respect to the axis of the arbor, all that is necessary is to back off the nut 18 and washer 16 and then to separate the discs of the two pairs so as to permit relative rotation thereof. The degree of relative rotation is indicated by the numerals. When the peripheral notches of the two inner discs are in registration and the zero (0) numbers of the outer discs likewise register therewith, the saw will be disposed perpendicularly with respect to the axis of the arbor. From this position the saw can be moved to a position of inclination with respect to the axis of the arbor by separating the two discs of each pair and rotate the outer discs relative to the inner discs so as to position such outer discs at, for example, the number four (4) point which would indicate that particular inclination of the saw.

Owing to the fact that saw blades differ in thickness and diameter, it is desirable that each user of the invention provide for his particular saw a gauge board and that the same be marked to indicate the positions indicated by the numbers on the disc. Such a board is indicated by the number 11 on the drawing. It is apparent that the number of degrees provided in the spacing between the numbers on the discs might vary. It is also apparent that the discs or washers must loosely fit the arbor so as to permit the adjustment which would involve tilting individual discs with respect to the axis of the arbor.

What I claim is:

In a saw assembly for a circular saw disposed upon an arbor between a pair of clamping nuts one of which nuts is adjustable over the arbor relative to the other nut, two complementary pairs of saw retaining discs provided with oversize arbor receiving passageways mounted upon the arbor, one pair upon each side of the saw, the two discs of each pair tapered from a minimum disc thickness at one end of the diameter to a maximum disc thickness at the opposite end of such diameter, the inner disc of each pair provided on its outer face with a locking pin at one end of said diameter projecting toward the outer disc of the pair and spaced inwardly from the margin of the disc, said disc also provided with a peripheral indicating mark registering with said pin, the locking pin disc of one pair having its pin located at the minimum thickness end of said diameter and the locking pin disc of the other pair having its pin located at the maximum thickness end of said diameter, the outer disc of each pair provided on its inner surface with a plurality of pin receiving recesses disposed spaced apart in a circumferential sequence extending from one end of said diameter toward the opposite end thereof spaced inwardly from the margin of the disc, the outer disc of each pair provided on its outer surface with a marginal beveled face bearing indicia registering with its pin receiving recesses and extending spaced apart in a circumferential sequence from one end of said diameter of the disc toward the opposite end thereof, said sequence extending as to the disc of one pair from the minimum thickness end of said diameter toward the maximum thickness end thereof and as to the corresponding disc of the other pair said sequence extending from the maximum thickness end of the diameter toward the minimum thickness end thereof.

EMMET J. WARREN.

REFERENCES CITED

The following references are of record in the file of this patent:

UNITED STATES PATENTS

| Number | Name | Date |
| --- | --- | --- |
| 45,677 | Rogers | Dec. 27, 1864 |
| 261,680 | Cook | July 25, 1882 |